July 14, 1942.     J. J. MUNSON     2,289,925
CENTRIFUGAL MACHINE
Filed Aug. 4, 1939     5 Sheets-Sheet 1
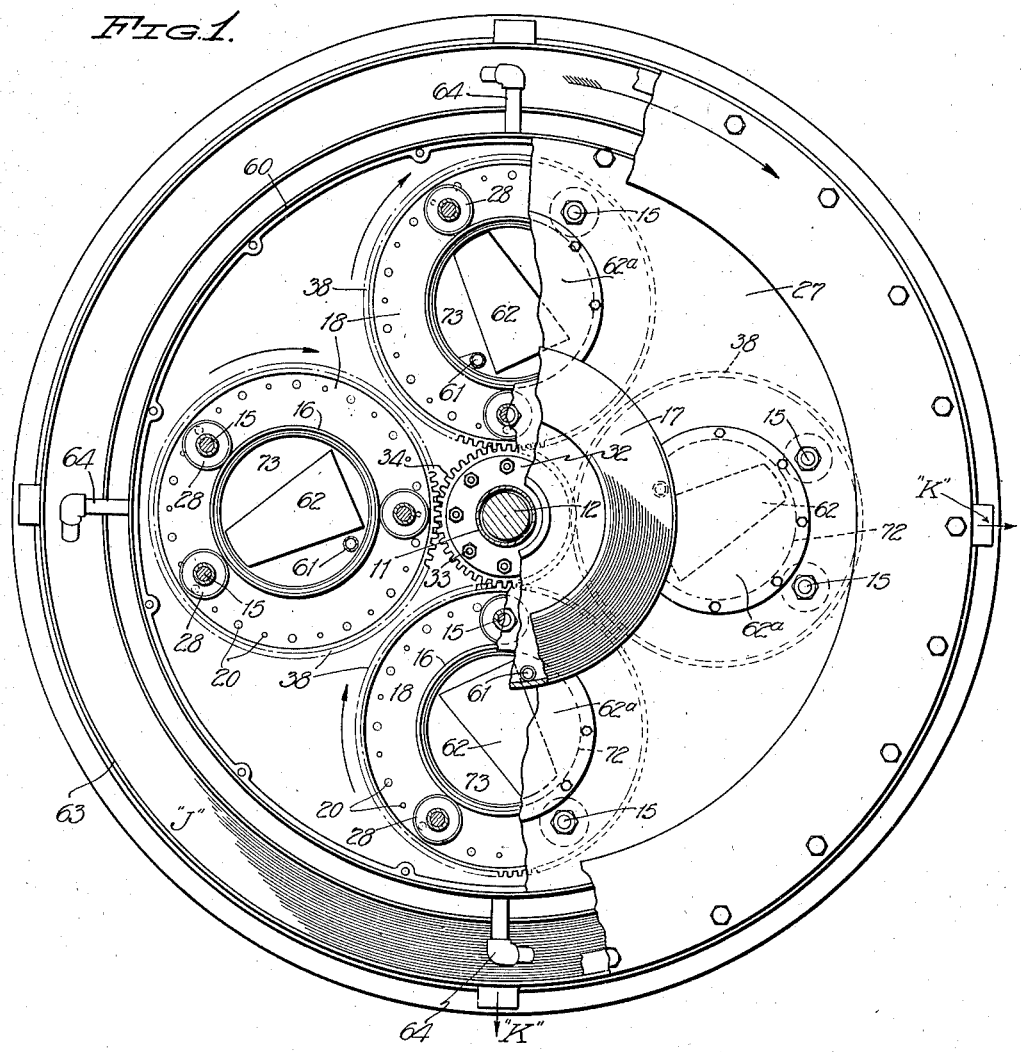
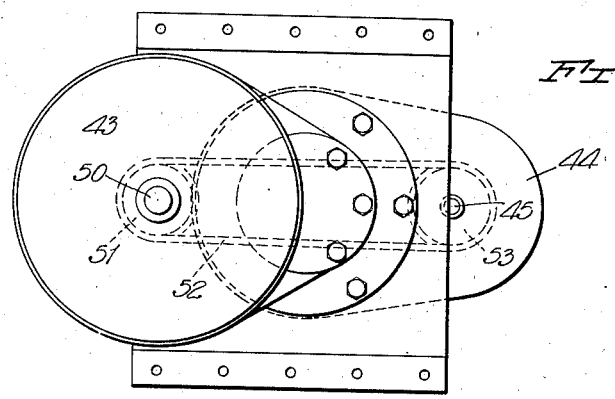
INVENTOR
Joseph Jones Munson
BY
his ATTORNEYS

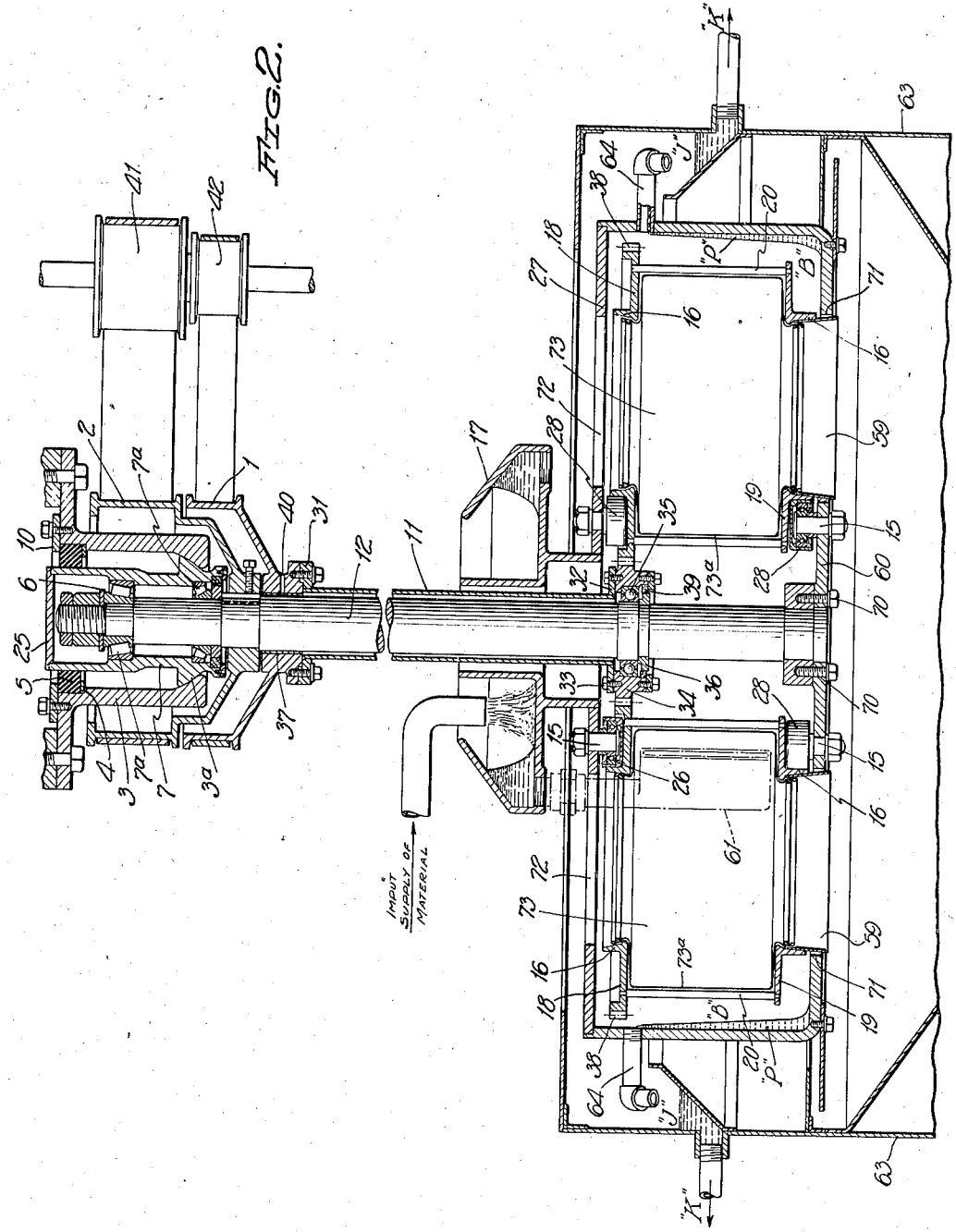

July 14, 1942.  J. J. MUNSON  2,289,925
CENTRIFUGAL MACHINE
Filed Aug. 4, 1939  5 Sheets-Sheet 3

INVENTOR
Joseph Jones Munson
BY
his ATTORNEYS

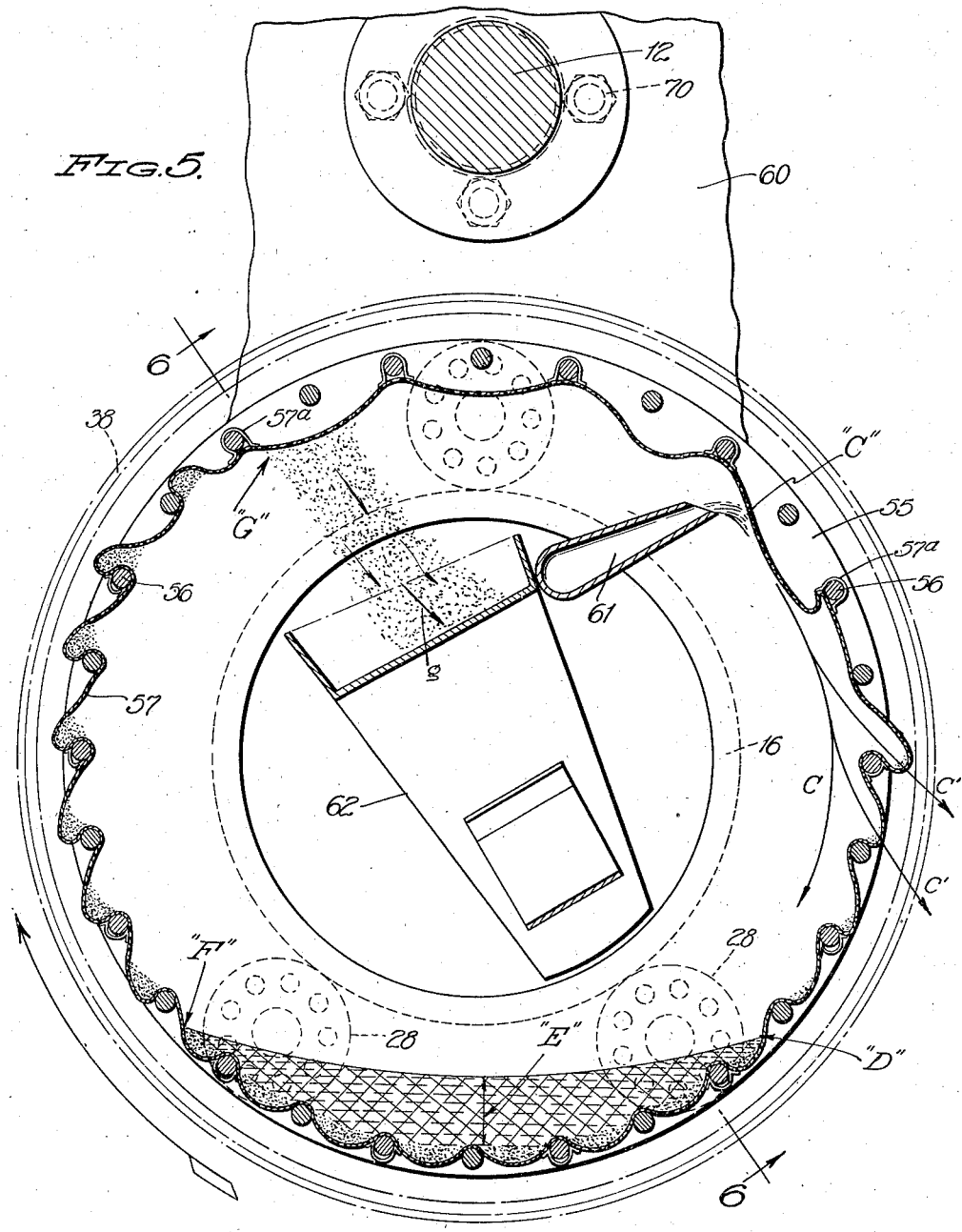

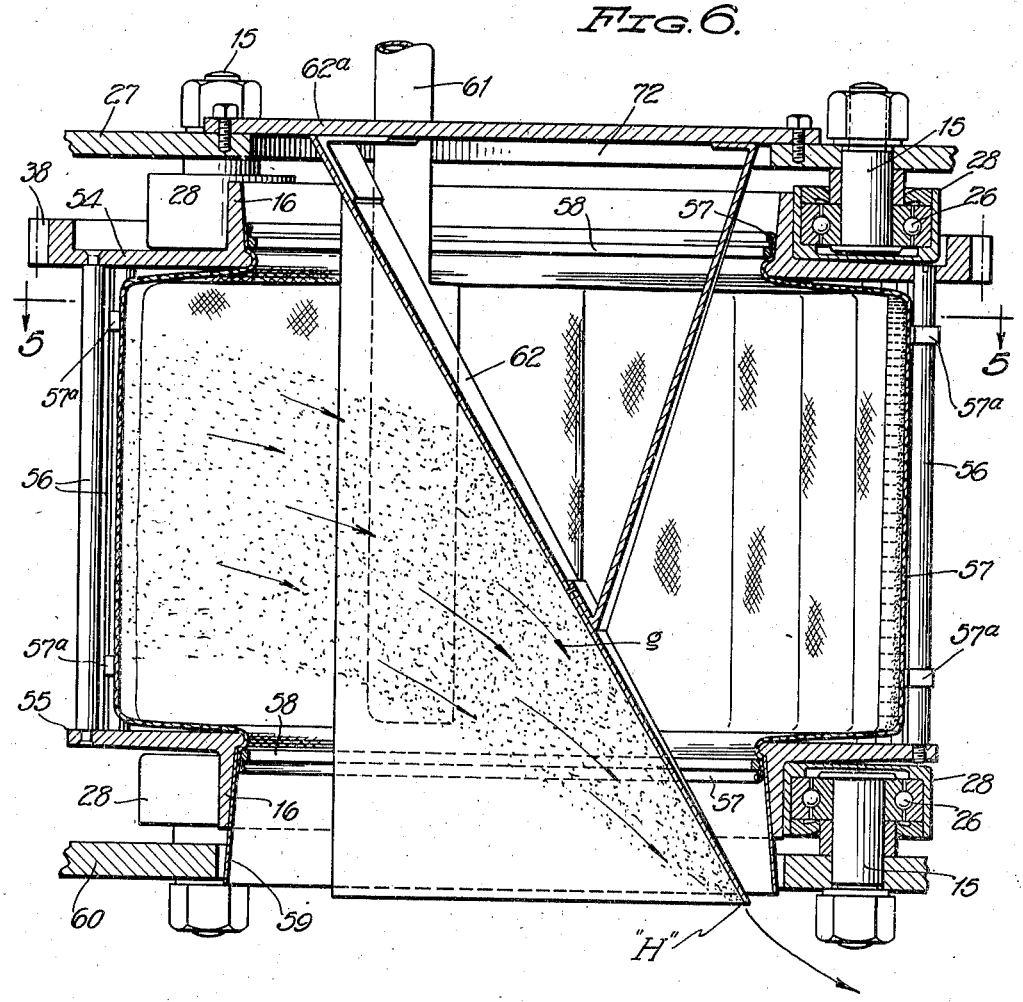
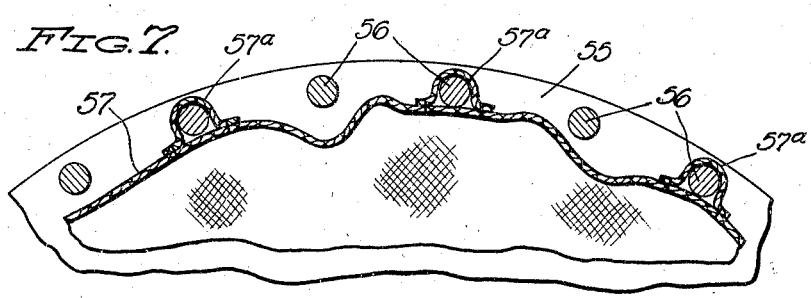

Patented July 14, 1942

2,289,925

UNITED STATES PATENT OFFICE 2,289,925

CENTRIFUGAL MACHINE

Joseph Jones Munson, Houma, La.

Application August 4, 1939, Serial No. 288,285

3 Claims. (Cl. 210—63)

My invention relates to centrifugal machines for the purpose of separating solid matter suspended in liquids by means of centrifugal force. The invention relates in particular to improvements on this type of machine disclosed in my United States Patents, Nos. 1,703,404 and 1,794,792. The particular improvements according to the present invention relate, first, to mechanical means for positive rotation of the individual separator baskets; and second, to a more efficient method and means of freeing the basket wall or the filtering medium from the filtered-out solid matter, to adapt the machine to more efficient continuous centrifugal filtration.

My invention is illustrated in the accompanying drawings, in which—

Figure 1 represents a plan view of the centrifugal machine, certain portions being shown in section and broken away.

Figure 2 represents a central sectional elevation of the machine shown in Figure 1.

Figure 3 represents in plan view the upper portion of the machine as arranged for a chain and gear drive.

Figure 5 represents an enlarged horizontal section taken substantially on line 5—5 of Figure 6, illustrating one modification of the rotary baskets of Figures 1 and 2.

Figure 6 represents a central sectional elevation taken substantially on line 6—6 of Figure 5.

Figure 7 represents a detail showing in larger scale and in plan view the arrangement of the filter cloth on the squirrel cage rods of the basket shown in Figures 5 and 6.

Figure 4:
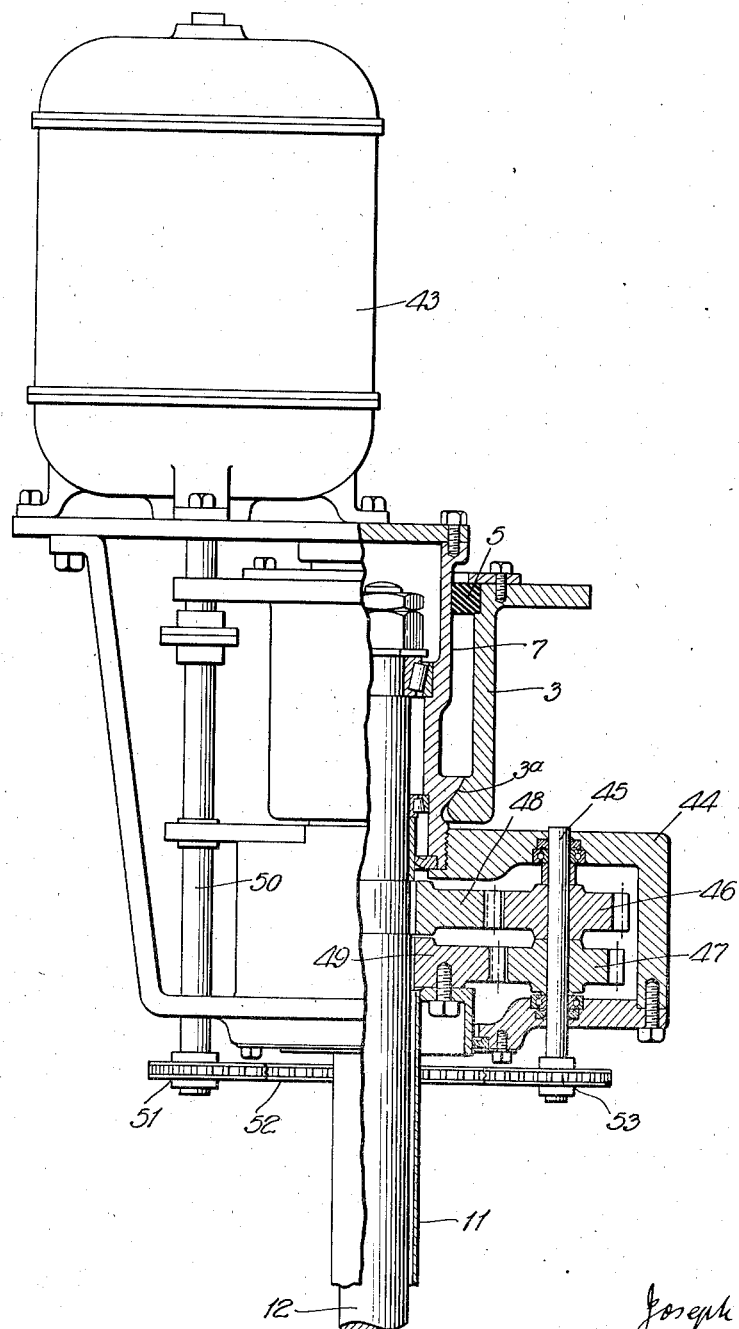
Figure 4 represents an elevation of the upper portion of the machine, Figure 3, shown partly in section.

The improved mechanical means for positively rotating the individual baskets, as distinguished from the basket rotations on their own axes brought about in my aforementioned patents, are as follows.

Referring to Figures 1 and 2, the central spindle 12, Figure 2, about which the individual baskets revolve, is suspended from a bearing head consisting of housing 3 having a spherical seat at 3ª which engages a correspondingly-shaped portion of bearing casing 7 in which are mounted roller bearings 7ª, 7ª, as shown. The top of bearing casing 7 engages rubber buffer 5 carried in housing 3. The purpose of this rubber buffer is to narrow the amplitude of swing of the bottom of spindle 12 as it may tend to oscillate or gyrate as the bearing casing moves about the spherical seat 3ª. Secured to spindle 12 near the top is pulley 2, thus providing means for the power input to rotate the entire revolving elements of the machine on spindle 12. Surrounding spindle 12 is quill 11, to the top of which is secured flange 31, and to the bottom of which is secured flange 32. Secured to flange 32 by means of bolts 33 is pinion 34. In the hub of pinion 34 is mounted ball bearing 35 which engages collar 36 secured to spindle 12. Bolted to flange 31 at the top of quill 11 is pulley 1, carrying a bushing 37 in bearing contact with spindle 12. Thus, means are provided for rotatably supporting quill 11 on spindle 12, as it is journalled at 35 at the bottom and at 37 at the top, and is prevented from downward movement by collar 36 and from upward displacement by pulley 2.

Lubrication is provided for bearing 35 by placing oil in the clearance space between quill 11 and spindle 12. Such oil is prevented from leaking out by means of packing 39. Bushing 37 is lubricated through oil hole 40.

To the lower end of spindle 12 is fixed, for instance by bolts 70, the bottom center of a cylindrical casing 60, provided with a cover 27 and containing four symmetrically-arranged rotary baskets 73 as shown in Figures 1 and 2. Cover 27 has an intake opening 72 for each basket, and the casing bottom has a discharge opening 71 for each basket. As Figure 2 shows, each basket is composed of an upper annular flange 18 and a lower annular flange 19, the two flanges being held together in spaced relation by means of rods 20 circumferentially spaced near the outer rims of the two flanges and fixed thereto, for instance by riveting or the like, so that the whole structure resembles a squirrel cage. The central portion of the upper flange 18 serves as basket intake, and that of the lower flange 19 as discharge opening for the basket, the latter opening being provided with an outwardly flaring apron 59 which protrudes through the appertaining casing opening 71. The basket is lined on the inside with filter cloth 73ª.

The baskets are supported rotatably in casing 60 substantially similar to the manner shown in my aforementioned patents and in the following manner. The inner rims of the two flanges 18 and 19 carry each a cylindrical roller race 16, and the bottom and top of casing 60 each carry stud bolts 15 adjacent to races 16 and on which rollers 23 are mounted by means of ball bearings 26. These rollers run on their respective adjacent race 16. In Figure 2 only the inner rollers for two oppositely disposed baskets are shown. From Figure 1 it clearly appears that three rollers are provided for the races of each basket, these rollers being suitably spaced around the circumference of their appertaining race so that each basket is supported by its top and bottom rollers to rotate on its own vertical axis, while it is bodily rotated with casing 60 by spindle 12. The top flange 18 of each basket is provided at its outer rim with gear teeth 38 of proper pitch and gear diameter so as to mesh with the aforementioned pinion 34 fixed on quill 11. Thus by rotating quill 11 relatively to spindle 12, the baskets can be individually rotated on their own axes within casing 60.

The arrangement so far described operates as follows.

The machine is set in rotation in the direction of the curved arrow, Figure 1, by supplying power from pulley 41 to pulley 2, for instance by means of a belt. Another belt placed on pulleys 1 and 42, 42 being secured to the same shaft as 41, causes the quill 11 to rotate at a slower speed than spindle 12. The result is first that the individual baskets revolve bodily around the quill 11 and pinion 34 in the same direction as the machine is rotated. Secondly, the individual baskets rotate about their own axes, the same as if spindle 12 were held stationary and quill 11 were revolved in a direction opposite that of the machine. Thus, by the action of pinion 34 in mesh with gears 38, all four individual baskets are revolved in this particular case in a clockwise direction, as shown by the curved arrows in Figure 1. This planetary gearing is designed so that the baskets revolve only relatively slow on their own axes.

Where a more positive drive than can be obtained by belts is desired, gears or chains or any other type of transmission may be employed. One method of driving by means of chain and gears is shown in Figures 3 and 4. Referring to Figure 4, a motor 43 is mounted on a base secured to bearing casing 7 so that it can swing on spherical seat 3ª together with quill 11 and spindle 12 as described with reference to Figure 1. Also secured to casing 7 is gear case 44 which carries jack shaft 45 on which is fixed drive gear 46 corresponding to pulley 41, Figure 2, and gear 47 corresponding to pulley 42. Gear 46 meshes with pinion 48 secured to spindle 12 and gear 47 meshes with pinion 49 secured to quill 11. Gear 46 is larger than 47 and gear 49 is larger than 48. Thus, the same conditions prevail with reference to individual slow basket rotation as with the belts as described above. The motor 43, with its extended shaft 50, drives shaft 45 by means of its sprocket 51 and a chain 52 driving in turn sprocket 53 mounted on jack shaft 45.

I shall now describe the provision for a more efficient method of cleaning the basket wall or filtering medium for the purpose of adapting the machine to centrifugal filtration.

One means for providing more efficient continuous freeing of the basket wall or filtering medium from the filtered solids when a flexible filter cloth is used is shown in Figures 5 and 6. In this case, the individual baskets are composed of a top flange 54 and a bottom flange 55, both held together by rods 56, forming together a sort of squirrel cage construction similar to that described with reference to Figure 2. Every other rod is arranged in this case, however, to slip through a hole in the top flange and screw into the bottom flange. Thus, each alternate rod may be removed by unscrewing and pulling it upward through the hole in top flange 54. The cloth or filtering medium 57 is formed as an endless band to fit in between the flanges, as shown, and is held in place at its edges by rings 58 forced into the conical-shaped necks of flanges 54 and 55 and by loops 57ª through which each alternate removable rod is passed, as shown in Figure 7. This cloth band is liberally dimensioned with respect to its circumferential length so that it can form small loops or pockets between rods 20 as shown in Figure 5. An apron 59, secured to race 16 of lower flange 55 and extending below the bottom of revolving casing 60, prevents solid material from entering the filtered liquor space B, Figure 2.

This arrangement operates as follows. Liquor to be filtered passes downward from annular distributor bowl 17, which is mounted centrally on top 27 of casing 16, as shown in Figure 2, and is delivered to each basket through an individual nozzle 61, Figures 2 and 5, striking the surface of cloth 57 at C in Figure 5. The centrifugal force effective in the direction of arrow $c$ causes the liquor to flow from C outwardly from spindle 12 in the direction of this arrow while, at the same time, part of the liquid is being forced through the cloth 57 into space B, leaving the solid matter deposited on the inner surface of the cloth. This action continues, resulting in a part of the liquor fed to the basket being filtered before the remainder reaches the point D, Figure 5. In the meantime the cloth has looped outwardly between rods 56 as shown by arrows $c'$, $c'$, thereby forming small pockets. At point D, in some instances, an accumulation of unfiltered liquor may commence, forming a crescent-shaped section between points D and F indicated by the crisscross shaded area. This area has a cylindrical meniscus facing spindle 12 and of a radius equal to the distance from the center of spindle 12 to this meniscus. The thickness E of this section varies in accordance with liquor accumulation, and as this dimension becomes greater, the pressure tending to force the liquor through the cloth also becomes greater.

Each basket, being in slow rotation on its own central axis in the direction of the curved outer arrow, Figure 5, by the expedients described hereinbefore, moves the cloth gradually away from under this crescent-shaped section of liquor, thus pulling toward F the retained solid matter which is held in the pockets formed by the cloth being thrown outwardly between rods 56. This solid matter, now relatively dry after it has slowly passed some distance beyond F, arrives gradually at G where the outward flexing of the cloth becomes reversed to an inward flexing due to the centrifugal force which, as it were, turns these pockets "inside out." Thereby the solid matter is shaken off the cloth and flies, due to the centrifugal force, in the direction of the arrow from G beneath the baffle 62 (see also arrow $g$ in Figure 6) and downward to H, Figure 6, where it is discharged through the bottom of casing 60 and enters the lower portion of the outer stationary casing 63, Figure 1, surrounding casing 60. Baffle or deflector 62 is fixed to the top 27 of casing 60 by means of a bridge 62ª traversing opening 72 in top 27. The filtered liquid, having passed through the cloth 57, enters the space B where it forms a steep paraboloid around the inner wall of 60, as shown at P, Figure 2, and eventually spills out near the top through nozzle 64 into the annular trough J provided at the inner wall of stationary casing 63 from where it is drawn off through pipe connections at K, K, Figure 2.

I claim:

1. In a centrifugal machine for separating solid matter from a liquid, comprising in combination a supporting member rotatable upon its axis, means for rotating said supporting member, a squirrel cage basket having staves spaced around its periphery and eccentrically mounted on said supporting member, means for rotating said basket on its own axis as the supporting member is rotated, flexible filter material resting against the inner periphery of the cage and being attached at peripherally-spaced points to the basket staves, said material having excess peripheral length between said points to form pockets between adjacent staves, means for supplying liquor to be filtered to the inner surface of said material at a point of the basket travelling away from said rotary machine axis at which the pockets commence to be pressed outwardly between the basket staves by the centrifugal force, whereby liquid is forced through the material and the solid matter collects in said pockets during their outward travel from said axis, said pockets being turned "inside out" by the centrifugal force on their reapproach to said axis, whereby the solid matter contained therein is forcibly shaken off the material and delivered into the interior of the basket.

2. In a centrifugal machine for separating solid matter from a liquid, a rotatable spindle, a rotary housing fixed on said spindle, cylindrical baskets rotatably mounted in said housing around said spindle, each basket being composed of an upper and lower annular flange and axially directed rods attached in spaced relation to said flanges near their outer peripheries to form a squirrel cage, flexible filter fabric disposed against said rods inside of the basket and being attached to alternate rods and having excess peripheral length between them to form individual pockets between adjacent rods, means for supplying material under treatment against the inner surface of said cloth at a point near the spindle axis to permit some of the liquid to filter through the fabric due to the prevailing centrifugal force as the basket periphery travels from said point outwardly from the spindle axis toward a peripheral zone further away from said axis where maximum centrifugal force prevails and to permit the remainder of the material to flow into said zone to be filtered there, whereby the filtered solid matter is retained in said pockets as the cloth travels from said zone back toward said spindle axis, said pockets being turned "inside out" by the centrifugal force as they reapproach the spindle axis, whereby the accumulated solid matter is shaken from the surface of said pockets and thrown toward the interior of the basket, and means for deflecting said solid matter downwardly and out of the lower end of the basket.

3. A squirrel cage basket according to claim 2 having alternate rods removably attached to the basket flanges and loops provided at the outer side of said fabric through which said removable rods are passed to removably attach the filter fabric to the inner periphery of the basket.

JOSEPH JONES MUNSON.